United States Patent
Kawakami

(10) Patent No.: US 8,423,795 B2
(45) Date of Patent: Apr. 16, 2013

(54) STORAGE CONTROLLER COMPRISING ENCRYPTION FUNCTION, DATA ENCRYPTION METHOD, AND STORAGE SYSTEM

(75) Inventor: Norihiko Kawakami, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 1238 days.

(21) Appl. No.: 11/969,446

(22) Filed: Jan. 4, 2008

(65) Prior Publication Data

US 2008/0240441 A1    Oct. 2, 2008

(30) Foreign Application Priority Data

Mar. 30, 2007   (JP) .................... 2007-092478

(51) Int. Cl.
G06F 11/30    (2006.01)

(52) U.S. Cl.
USPC ............... 713/193; 713/1; 713/189; 380/277

(58) Field of Classification Search .............. 713/1, 193, 713/189; 380/227, 277
See application file for complete search history.

(56) References Cited

U.S. PATENT DOCUMENTS

| | | | | |
|---|---|---|---|---|
| 7,685,165 B2* | 3/2010 | Gopisetty et al. | .......... | 707/999.2 |
| 2005/0220305 A1* | 10/2005 | Fujimoto et al. | .............. | 380/255 |
| 2006/0015946 A1* | 1/2006 | Yagawa | .......................... | 726/32 |
| 2006/0062383 A1* | 3/2006 | Kaneda et al. | .................. | 380/28 |
| 2009/0113320 A1* | 4/2009 | Gn et al. | ........................ | 715/762 |
| 2010/0031017 A1* | 2/2010 | Gokhale et al. | ............... | 713/153 |

FOREIGN PATENT DOCUMENTS

JP    2005-322201    11/2005

* cited by examiner

*Primary Examiner* — Harunur Rashid
(74) *Attorney, Agent, or Firm* — Antonelli, Terry, Stout & Kraus, LLP.

(57) ABSTRACT

Proposed are a storage controller equipped with an encryption function, a data encryption method, and a storage system enabling a user to apply one's desired encryption policy to data received from a computer or the like. This storage controller includes a storage apparatus for storing data from a computer, and a controller for controlling the input and output of data stored in the storage apparatus. The controller has a configuration information management unit for managing configuration information of attributes concerning an encryption function as information for encrypting data, and an encryption execution unit for performing encryption of data from the computer and data stored in the storage apparatus based on the configuration information of attributes concerning the encryption function.

12 Claims, 15 Drawing Sheets

FIG.8

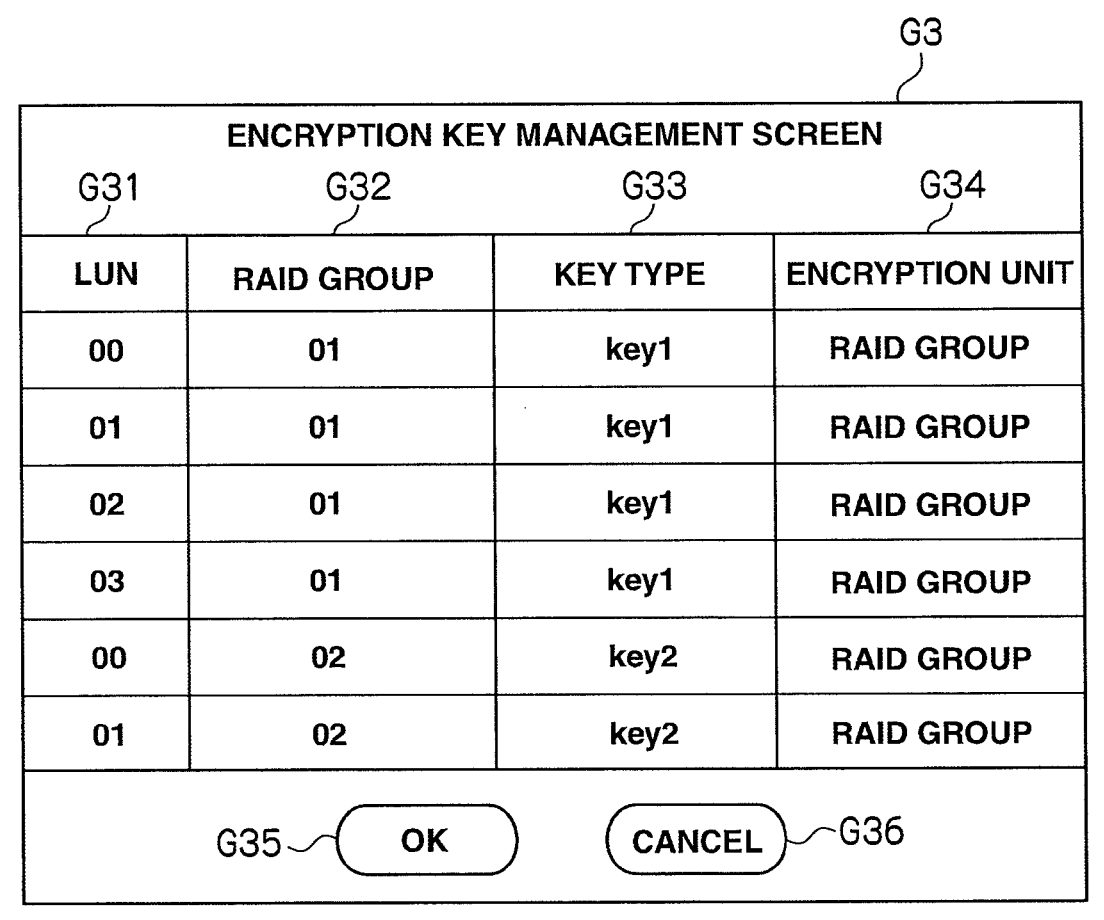

ENCRYPTION KEY MANAGEMENT SCREEN

| LUN | RAID GROUP | KEY TYPE | ENCRYPTION UNIT |
|-----|------------|----------|-----------------|
| 00  | 01         | key1     | RAID GROUP      |
| 01  | 01         | key1     | RAID GROUP      |
| 02  | 01         | key1     | RAID GROUP      |
| 03  | 01         | key1     | RAID GROUP      |
| 00  | 02         | key2     | RAID GROUP      |
| 01  | 02         | key2     | RAID GROUP      |

OK    CANCEL

FIG.9

ENCRYPTED DATA ADDRESS MANAGEMENT TABLE — 252

| LUN (2521) | RAID GROUP (2522) | START LBA (2523) | LEN (2524) |
|---|---|---|---|
| 00 | 01 | 512B | k |
| 00 | 01 | 1024B | l |
| 00 | 02 | 512B | m |
| 00 | 03 | 2048B | n |

FIG.10

ENCRYPTED AREA MANAGEMENT TABLE — 253

| ID (2531) | RAID GROUP (2532) | LUN (2533) | ENCRYPTION KEY (2534) | ENCRYPTION ATTRIBUTE (2535) | RELATED AREA (2536) |
|---|---|---|---|---|---|
| 00 | 01 | 00 | key1 | 1 | — |
| 01 | 01 | 01 | key1 | 1 | — |
| 02 | 02 | 00 | key1 | 1 | ID00-SVOL |
| 03 | 02 | 01 | key2 | 1 | ID00-SVOL |
| 04 | 03 | 00 | — | 0 | ID01-VVOL |

FIG.11

ENCRYPTION POLICY MANAGEMENT TABLE 254

| ENCRYPTION FUNCTION ITEM 2541 | DETAILED ITEM 2542 | SETTING VALUE 2543 |
|---|---|---|
| ENCRYPTION FUNCTION | | VALID |
| ENCRYPTION UNIT | | APPARATUS |
| ENCRYPTION RANGE | PRIMARY DATA | ENCRYPTION |
| | BACKUP DATA | ENCRYPTION |
| | DIFFERENTIAL DATA | ENCRYPTION |
| | REMOTE COPY DATA | PLAIN TEXT |
| Rekey | | 2008/01/10 |

FIG.12

| ENCRYPTION KEY MANAGEMENT TABLE | | | | 255 |
|---|---|---|---|---|
| KEY TYPE (2551) | RAID GROUP (2552) | LUN (2553) | KEY CREATION DATE/TIME (2554) | |
| key1 | 01 | 00 | 2007/01/10/13:58:20 | |
|  | 01 | 01 | 2007/01/10/13:58:20 | |
|  | 01 | 02 | 2007/01/10/13:58:20 | |
| key2 | 02 | 00 | 2007/01/15/09:00:12 | |
| key3 | 03 | 00 | 2007/01/18/12:15:13 | |
| key4 | 04 | 00 | 2007/01/18/12:18:14 | |

STORAGE CONTROLLER COMPRISING ENCRYPTION FUNCTION, DATA ENCRYPTION METHOD, AND STORAGE SYSTEM

CROSS REFERENCES

This application relates to and claims priority from Japanese Patent Application No. 2007-092478, filed on Mar. 30, 2007, the entire disclosure of which is incorporated herein by reference.

BACKGROUND

The present invention relates to a storage controller comprising an encryption function, a data encryption method, and a storage system.

In organizations such as corporations, a storage controller configured separately from a host computer system (hereinafter referred to as a "host") is used to manage vast quantities of data. This kind of storage controller, for example, has numerous storage apparatuses such as hard disk drives built therein so as to provide a large-capacity storage area to the host.

The storage controller, for instance, stores various types of important confidential information such as personal information including the address and name of individuals, credit information and so on. Accordingly, technology for securely managing such important information and preventing unauthorized access is sought after.

A method of managing a storage controller using encryption technology for protecting important data is disclosed in Japanese Patent Laid-Open Publication No. 2005-322201 (Patent Document 1).

In Patent Document 1, an encryption processing unit is provided between a host interface connected to a host and a transfer control unit within an interface for controlling the communication with the host. Data received from the host is encrypted with the encryption processing unit, and then written in the hard disk drive. Like this, with the technology described in Patent Document 1, the encryption of data is performed within the storage controller, and security of data to be stored in the storage controller can thereby be ensured. In addition, according to Patent Document 1, by encrypting and storing data in a storage controller that stores vast quantities of important data, even when data is divulged to a third party who is not the owner of such data, the encryption of data will be able to prevent the unauthorized use of the divulged data.

SUMMARY

In a case where the encryption function is validated and operated from the initial installation of the storage controller for data received from all hosts, it is possible to encrypt and protect all data. Nevertheless, in a case of operating the storage controller where data to be encrypted and normal data that does not need to be encrypted (hereinafter referred to as "plain text data") coexist, or operating the storage controller by validating the encryption function midway as a result of adding a function concerning the storage controller after the initial installation or upgrading the storage controller itself, it is difficult to encrypt and protect all data that was previously stored.

Further, in the operation of the foregoing storage controller, as a result of validating the encryption function midway during the operation where the stored data was being managed as plain text data, although it will be possible to support data protection by encryption regarding the data to be handled after the validation of the encryption function, data that was handled before the validation of the encryption function will not be subject to data protection by encryption. Thus, the operation of the foregoing storage controller is left with the risk of divulging data.

For example, in a case of storing several generations of backup data in a time series as with the snapshot technology, when the storage controller is storing plain text data as primary data, backup data is also normally stored as plain text data. When the operation policy of the storage controller is changed at a certain point in time and the encryption function is validated, plain text data received by the storage controller after the validation of the encryption function will be subject to encryption processing, and stored as encrypted data. When backing up this encrypted data, data that was encrypted from the time the encryption function was validated until it is updated is stored as backup data. Nevertheless, backup data before the validation of the encryption function will continue to be stored as plain text data in the storage controller.

In addition, a typical method would be to handle the primary data to be used by the host or the like as plain text data as per normal operation, and encrypting only the backup data. Moreover, another method would be to encrypt and operate backup data in the storage controller, and ultimately back up the backup data to a tape or other media for temporary storage, and transporting such backup data to a remote location as measures against disasters. Nevertheless, since the media to store data must be a portable media, there is a high risk of data divulgence due to theft or loss since such portable media must be removed, transported and stored outside.

In addition, the operation of encrypting data to be stored in the storage controller is decided based on the encryption policy for the data protection by users such as the user's awareness level concerning security, costs required for encryption, processing performance of the storage controller, and the like.

Thus, an object of the present invention is to provide a storage controller comprising an encryption function, a data encryption method, and a storage system enabling a user to apply one's desired encryption policy to data received from a host or the like. Other objects of the present invention will be apparent from the following detailed description of the preferred embodiments.

In order to achieve the foregoing object, the present invention provides a storage controller comprising a storage apparatus for storing data from a host, and a controller for controlling the input and output of data stored in the storage apparatus. The controller comprises a configuration information management unit for managing configuration information of attributes concerning an encryption function as information for encrypting data, and an encryption execution unit for performing encryption of data from the host and data stored in the storage apparatus based on the configuration information of attributes concerning the encryption function.

Thereby, the storage controller of this invention comprises a function for encrypting data, and is able to encrypt data from a host that has not been encrypted, and data which has been previously stored in the storage apparatus.

The present invention additionally provides a data encryption method of a storage controller comprising a storage apparatus for storing data from a host, and a controller for controlling the input and output of data stored in the storage apparatus. The controller performs a configuration information management step for managing configuration information of attributes concerning an encryption function as information for encrypting data, and an encryption execution step for performing encryption of data from the host and data stored in the storage apparatus based on the configuration information of attributes concerning the encryption function.

Thereby, the storage controller of this invention comprises a function for encrypting data, and is able to encrypt data from a host that has not been encrypted, and data which has been previously stored in the storage apparatus.

The present invention further provides a storage system comprising a storage controller for controlling the input and output of data to be stored in a storage apparatus for storing data from a host. The controller comprises a configuration information management unit for managing configuration information of attributes concerning an encryption function as information for encrypting data, and an encryption execution unit for performing encryption of data from the host and data stored in the storage apparatus based on the configuration information of attributes concerning the encryption function.

Thereby, the storage controller of this invention comprises a function for encrypting data, and is able to encrypt data from a host that has not been encrypted, and data which has been previously stored in the storage apparatus.

Further, the storage controller of the present invention comprises an interface for a user to set the encryption policy so as to provide a means for such user to set one's desired encryption policy, and stores the set encryption policy as the configuration information of the storage controller. Moreover, the storage controller of the present invention comprises a function for autonomously implementing the encryption processing concerning data to be processed by the storage controller based on the stored encryption policy.

The user sets the encryption policy and sets the validation/invalidation of the encryption function using the management software of the storage controller, and through the OS (Operating System) and applications operating in the host or the like. Separate from the foregoing settings, the user sends and receives data to and from the storage controller based on data processing in normal business and operation.

The storage controller performs encryption processing and decryption processing of data to be sent and received based on the set encryption policy, and encrypts the data previously stored in the storage controller as needed. The target of encryption will be storage areas such as LUs (Logical Units), RAID groups, disk drives, temporary storage areas of internal data, and cache memories, and specifically includes the backup areas of the designated LU.

When the encryption processing has been set at the time the encryption policy was applied, the storage controller encrypts and processes data subsequently input to and output from the host, performs encryption processing to plain text data previously stored in the storage controller before the encryption processing was started based on the setting of the encryption policy when it is necessary to encrypt such plain text data and performs re-encryption using a different encryption key regarding the encrypted data, and performs processing for protecting the encryption policy concerning the encryption of the storage area or the copy or backup of data.

Incidentally, although not expressly provided herein, the storage controller shall also perform decryption processing of encrypted data as needed.

According to the present invention, by applying the encryption policy set in the storage controller to such storage controller, it is possible to encrypt all previously stored data within the storage controller even in cases when the operation of the storage controller is changed. Thus, various types of data such as backup data that are not directly operated by the user can also be protected reliably.

Further, as a result of providing a means for setting the encryption policy to the storage controller, a user of the storage controller will be able to prevent the divulgence of encrypted data based on the desired security level at such time (data processing performance of storage controller, storage controller comprising an encryption function, operational cost, importance of data, etc.).

DESCRIPTION OF DRAWINGS

FIG. 8 is an explanatory diagram showing an encryption key management screen according to an embodiment of the present invention;

FIG. 9 is a chart showing an encrypted data address management table according to an embodiment of the present invention;

FIG. 10 is a chart showing an encrypted area management table according to an embodiment of the present invention;

FIG. 11 is a chart showing an encryption policy management table according to an embodiment of the present invention;

FIG. 12 is a chart showing an encryption key management table according to an embodiment of the present invention;

DETAILED DESCRIPTION

Figure 1:
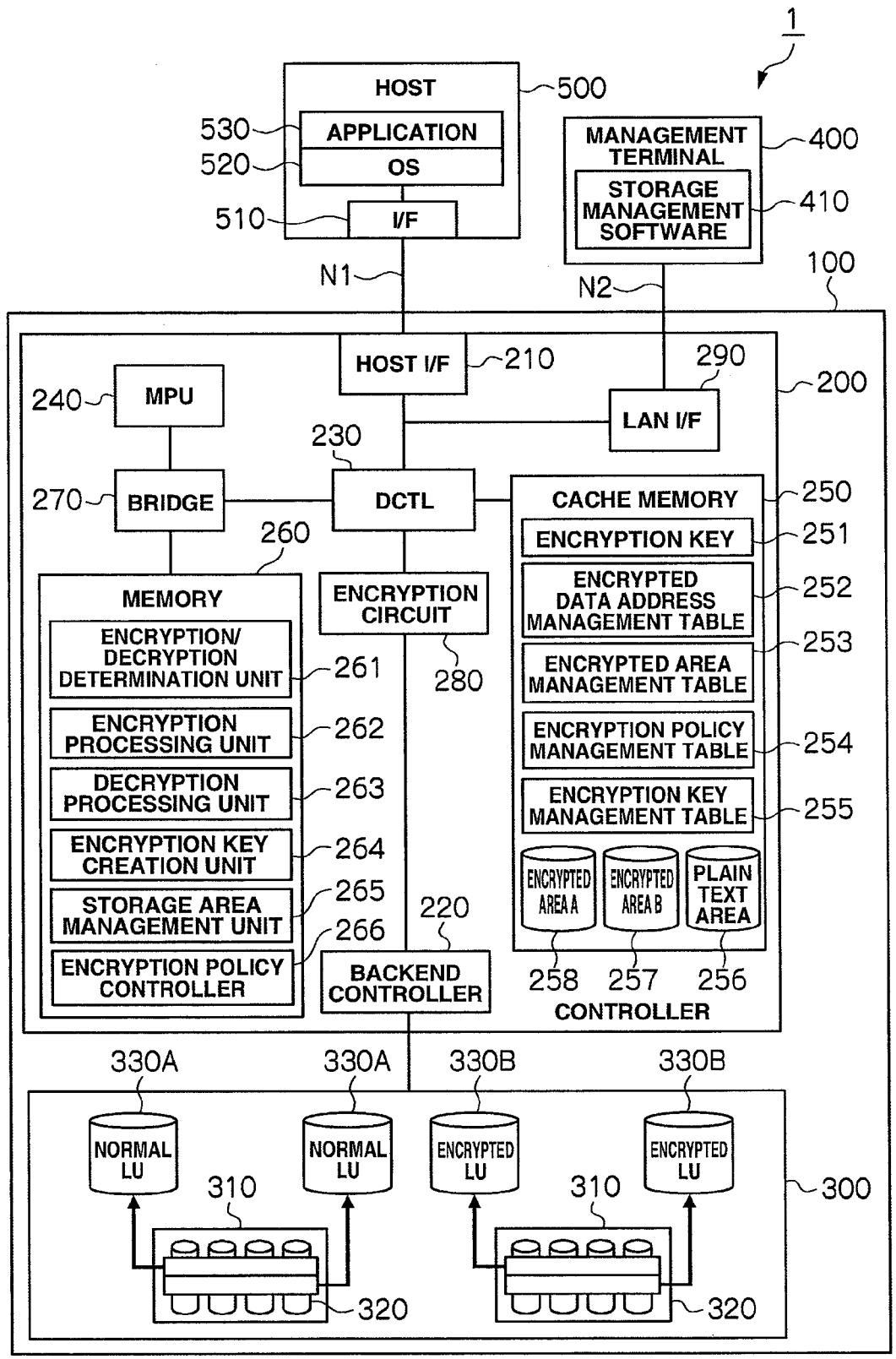
FIG. 1 is an explanatory diagram showing the overall configuration of a storage system according to an embodiment of the present invention.

An embodiment of the present invention is now explained with reference to the attached drawings. FIG. 1 is an explanatory diagram showing the overall configuration of a storage system 1 according to the present embodiment. The storage system 1 is a memory system, and is configured by a storage apparatus 100 being connected to a host 500 via a communication network N1 and connected to a management client 400 via a communication network N2.

Configuration of the host 500 is foremost explained.

The host 500 comprises a communication interface (abbreviated as "I/F" in the drawings) 510, an operating system (abbreviated as "OS" in the drawings) 520 and an application program 530. The host 500 accesses the storage apparatus 100 from the communication interface 510 via the communication network N1 such as a SAN. When the host 500 performs data processing such as operation of files based on the application program 530, a command according to the data processing is issued from the host 500.

Incidentally, as examples of the foregoing command, there is a write command for requesting the writing of data, a read command for requesting the reading of data, and so on.

Configuration of the management client 400 is now explained.

The management client 400 is configured as a computer device, and is connected to the storage apparatus 100 via the communication network N2 such as a LAN. The management client 400 comprises storage management software 410. The storage management software 410 is a program for managing the configuration and setup status of the storage apparatus 100, and acquiring and displaying the various types of information of the storage apparatus 100. By operating the management screen provided by the storage management software 410, the user is able to configure various settings regarding encryption. Incidentally, an example of this management screen will be described later.

Configuration of the storage apparatus 100 is now explained.

The storage apparatus 100 is a storage controller, and comprises a controller 200 for controlling the operation of the storage apparatus 100, and a storage apparatus mounting unit 300 including a plurality of storage apparatuses 330A, 330B.

The controller 200, for example, comprises a host interface 210, a backend controller 220, a data link control circuit (abbreviated as "DCTL" in the drawings) 230, a processor (abbreviated as "MPU" in the drawings) 240, a cache memory 250, a memory 260, a bridge 270, an encryption circuit 280, and a LAN interface 290.

The host interface 210 controls the communication with the host 500. The various types of commands and data issued from the host 500 are received by the host interface 210. Data read from the storage apparatuses 330A, 330B and a completion notice for notifying that the processing of commands is complete are sent from the host interface 210 to the host 500.

The backend controller 220 controls the communication with the respective storage apparatuses 330A, 330B. The backend controller 220 converts a logical block address (LBA) and a physical address of the storage apparatuses 330A, 330B.

The data link control circuit 230 is a circuit for controlling the data link in the controller 200. The data link control circuit 230 controls the data link between the host interface 210 and the cache memory 250, and the data link between the backend controller 220 and the cache memory 250.

The processor 240 comprises one or more processor cores. The processor 240 realizes the various types of functions described later by reading and executing the programs stored in the memory 260.

The cache memory 250 stores data received from the host 500 and data read by the host 500. In addition to storing user data such as write data and read data, the cache memory 250 also stores various types of information concerning the encryption to be performed within the storage apparatus 100.

Various types of information concerning the encryption include an encryption key 251, an encrypted data address management table 252, an encrypted area management table 253, an encryption policy management table 254, and an encryption key management table 255.

The cache memory 250 comprises areas for storing user data to be stored in the cache memory 250. In FIG. 1, these areas are specified as an encrypted area A 258, an encrypted area B 257, and a plain text area 256. In addition to the foregoing areas, areas are secured in accordance with the storage volume and unit of user data.

The encryption key 251 is used for encrypting plain text data in the storage apparatus 100 into encrypted data, or decrypting the encrypted data into plain text data. The various types of tables 252 to 255 will be described later with reference to the relevant drawings.

The memory 260 is used for storing programs and control information. The memory 260 stores programs for realizing various types of programs such as an encryption/decryption determination unit 261, an encryption processing unit 262, a decryption processing unit 263, an encryption key creation unit 264, a storage area management unit 265, and an encryption policy control unit 266.

Incidentally, all or a part of these programs for realizing the respective functions may be transferred from the storage apparatuses 330A, 330B to the memory 260 when the storage apparatus 100 is activated.

The encryption/decryption determination unit 261 is a function for determining whether to encrypt the write data received from the host 500, and determining whether to decrypt the read data requested from the host 500.

The encryption processing unit 262 performs encryption processing, using the encryption circuit 280, to the data determined to be encrypted by the encryption/decryption determination unit 261.

Similarly, the decryption processing unit 263 performs decryption processing, using the encryption circuit 280, to the data determined to the decrypted by the encryption/decryption determination unit 261.

The encryption key creation unit 264 creates an encryption key to be used in the encryption processing or the decryption processing;

The storage area management unit 265 is a function for creating the storage apparatuses 330A, 330B, setting encryption attributes to the storage apparatuses 330A, 330B (differentiation of encrypted storage area or non-encrypted storage area), and setting the connection relationship of the storage apparatuses 330A, 330B and the host 500. The user configures these settings using the management client 400.

The encryption policy control unit 266 is a function for performing data control in order to apply the encryption policy set by the user to the storage apparatus 100. The encryption policy control unit 266 performs data processing that is required upon applying the policy set with the encryption processing and decryption processing of data and with the copy processing and re-encryption processing of data to be performed within the storage apparatus 100.

The bridge 270 connects the processor 240 and the memory 260. Further, the processor 240 is connected to the data link control circuit 230 via the bridge 270.

The encryption circuit 280 is a circuit for encrypting the plain text data into encrypted data, or decrypting the encrypted data into plain text data. The encryption circuit 280 is controlled by the encryption processing unit 262.

The encryption circuit 280, for instance, as shown in FIG. 1, may be provided between the data link control circuit 230 and the backend controller 220. Otherwise, for example, a configuration of providing the encryption circuit 280 between the data link control circuit 230 and the host interface 210, a configuration of providing the encryption circuit 280 in the data link control circuit 230, and a configuration of providing the encryption circuit 280 in the processor 240 and the like may be considered.

The LAN interface 290 is used for communicating with the management client 400.

Configuration of the storage apparatus mounting unit 300 is now explained.

The storage apparatus mounting unit 300 comprises a plurality of storage apparatuses 330A, 330B.

The storage apparatus 330A is set with an attribute of a non-encrypted storage area, and stores plain text data.

Meanwhile, the storage apparatus 330B is set with an attribute of an encrypted storage area, and stores encrypted data.

Incidentally, unless specifically differentiated herein, the storage apparatuses 330A, 330B are referred to as a storage apparatus 330 in the ensuing explanation.

The specific configuration of the storage apparatus 330 is now explained.

Foremost, a RAID group 320 is configured from one or more physical storage apparatuses 310.

In order to avoid confusion with the logical storage apparatus 330, the physical storage apparatus 310 is referred to as a disk drive 310, and the logical storage apparatus 330 is referred to as a LU or a logical volume. Further, the LU 330 set in the encrypted storage area is sometimes referred to as an encrypted LU in the drawings.

Incidentally, although the disk drive 310 is configured as a hard disk drive in this embodiment, it may also be configured from a semiconductor memory device or the like.

The RAID group 320 is configured by grouping the physical storage areas in each of the plurality of disk drives 310. A plurality of LUs (logical volumes) 330 may be provided to the storage area of the RAID group 320.

Incidentally, the foregoing hardware configuration is merely an example, and the present invention shall not be limited to the foregoing configuration. In other words, the present invention merely requires a configuration where data can be read from and written into the LUs 330A, 330B according to commands from the host 500, configuration information concerning encryption can be updated based on commands from the management client 400, and data can be encrypted and decrypted within the storage apparatus 100.

Figure 2:
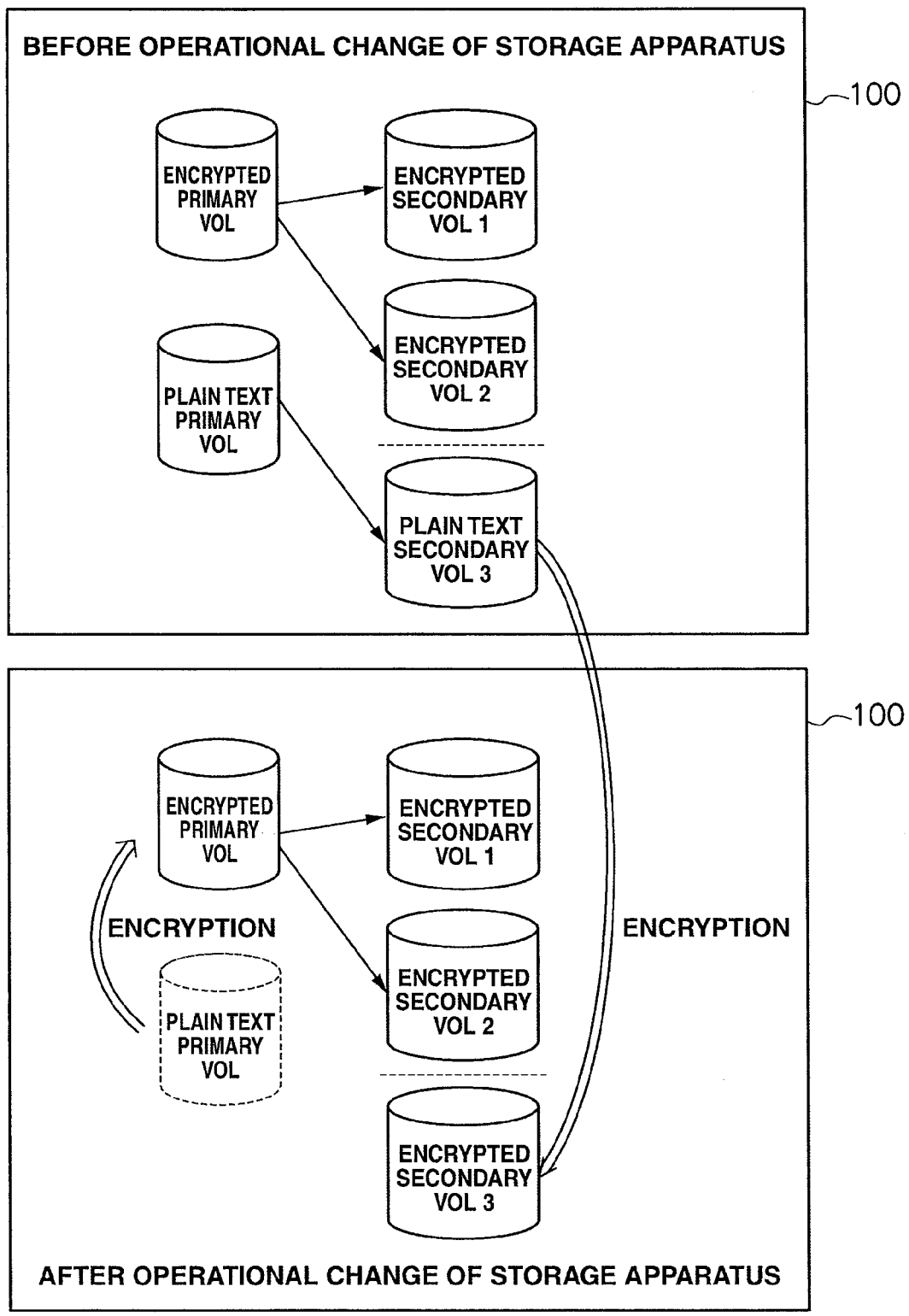
FIG. 2 is a schematic diagram showing an example of encryption operation of backup data in a storage apparatus according to an embodiment of the present invention.

FIG. 2 is a schematic diagram showing a state before and after the operational change in the operation method of the storage apparatus 100 in this embodiment.

The storage apparatus 100 of this embodiment operates, among the foregoing logical volumes 330, the logical volume storing data from the host 500 as a primary-side logical volume, and the logical volume storing backup data of data stored in the primary-side logical volume as a secondary-side logical volume.

By setting the encryption policy to the storage apparatus 100 while its being operated, the user changes the method of operation of a primary-side logical volume (abbreviated as "plain text primary VOL" in the drawings) for storing and managing plain text data to a primary-side logical volume (abbreviated as "encrypted primary VOL" in the drawings) for storing and managing encrypted data at a certain point in time. Incidentally, the plain text primary volume and the encrypted primary volume are configured from the foregoing logical volumes 330.

In FIG. 2, the upper diagram shows the data management status in a plurality of logical volumes before the operational change of the storage apparatus 100, and the lower diagram shows the data management status in a plurality of logical volumes after the operational change of the storage apparatus 100.

Foremost, in the case before the operational change of the storage apparatus 100, the plain text primary volume is being managed to store plain text data. In the foregoing case, the storage apparatus 100 periodically creates a snapshot of the plain text primary volume, and simultaneously performs backup of the plain text data to store backup data. This backup data is also stored and managed in a secondary-side logical volume (abbreviated as "plain text secondary VOL" in the drawings) 3 of the plain text data.

Here, the operation of the storage apparatus 100 is changed with a conventional method. In other words, the operation is changed so that the plain text data is encrypted and managed in the encrypted primary volume. After the operation is changed as described above, the backup data created as a snapshot is also stored as encrypted data in the secondary-side logical volume (abbreviated as "encrypted secondary VOL" in the drawings). After the operation is changed based on a conventional method, as shown in the lower diagram of FIG. 2, the storage apparatus 100 will manage the encrypted secondary volume 1 and the encrypted secondary volume 2.

Incidentally, the encrypted secondary volume 1 and the encrypted secondary volume 2 are logical volumes 330 for storing encrypted data, and the number of volumes is not limited to the number illustrated in the diagrams.

Here, the user is able to operate the storage apparatus 100 with an encryption policy of preventing the divulgence of data by encrypting data during the operation of the storage apparatus 100. Nevertheless, the backup data acquired before the plain text primary volume was encrypted will continue to be stored as plain text data in the plain text secondary volume 3. Therefore, the risk of divulging data will remain since the disk drive 310 in the storage apparatus 100 may encounter trouble such as being stolen.

Thus, the lower diagram of FIG. 2 shows a case of operating the storage apparatus 100 with an encryption policy desired by the user at the point in time when the plain text primary volume is encrypted. Specifically, the lower diagram of FIG. 2 shows a case where, when the user configures the setting so that the existing backup data is encrypted, the storage apparatus 100 encrypts the plain text secondary volume into the encrypted secondary volume 3 when the plain text primary volume is encrypted.

Figure 3:
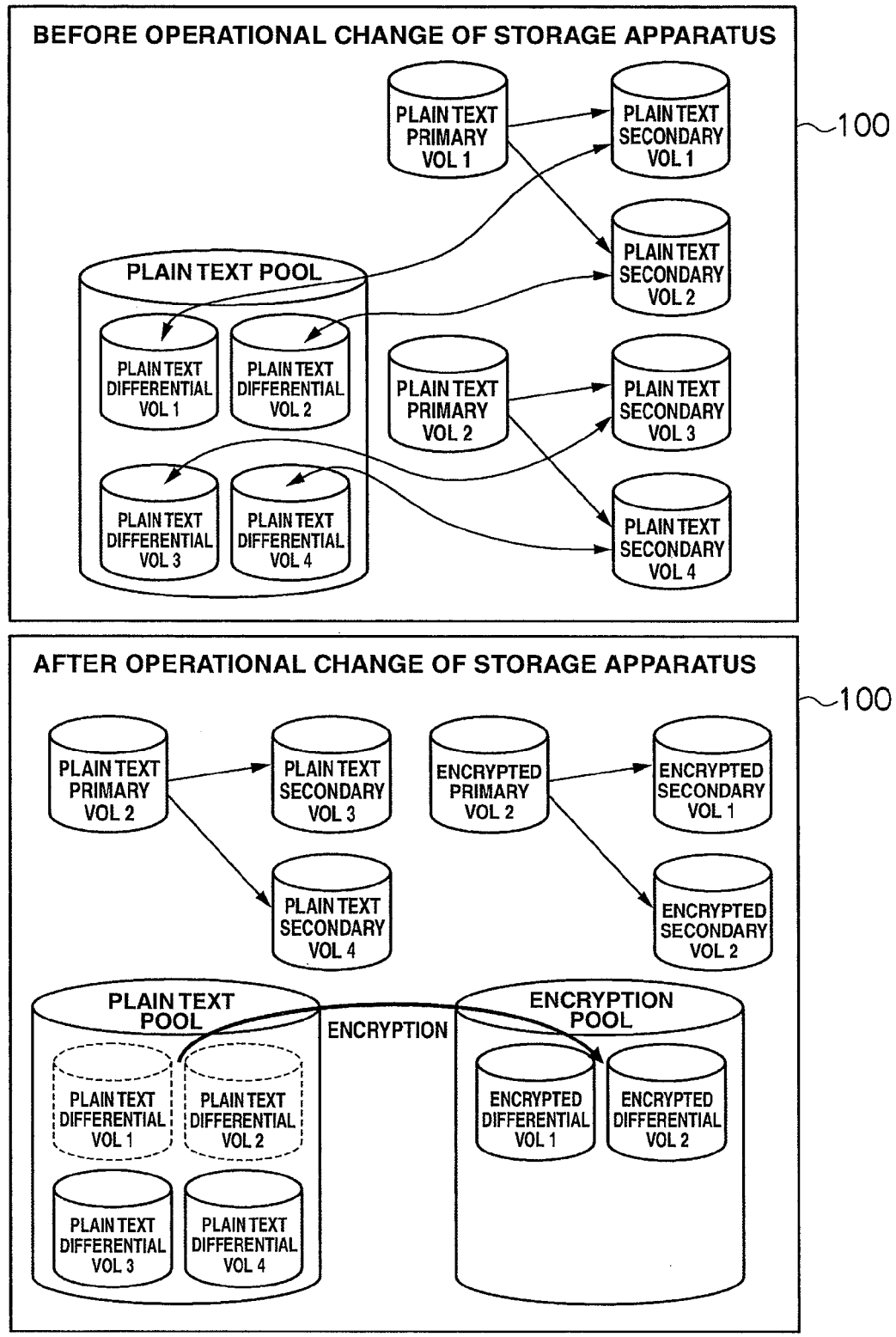
FIG. 3 is a schematic diagram showing an example of encryption operation of update differential data in a storage apparatus according to an embodiment of the present invention.
Figure 4:
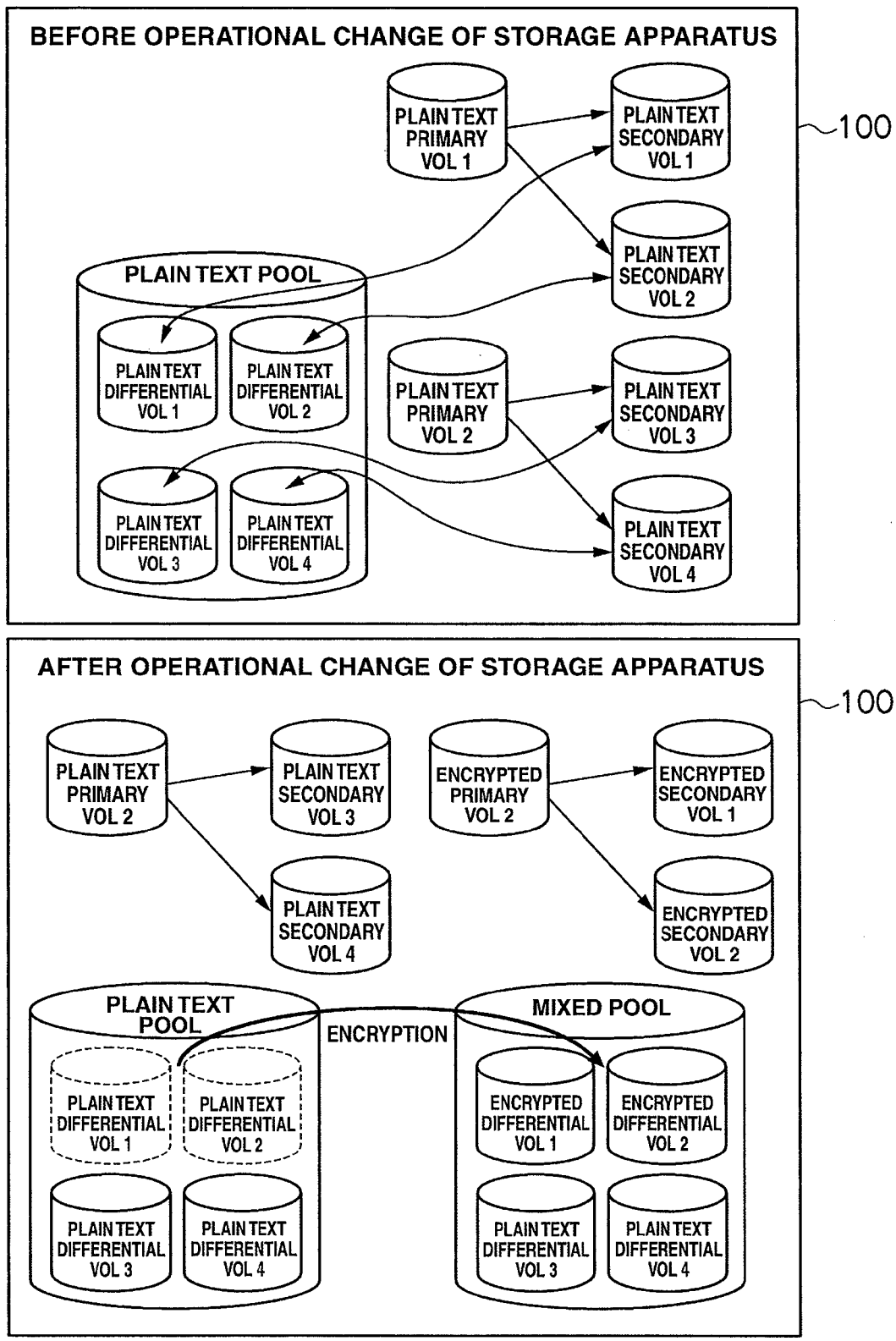
FIG. 4 is a schematic diagram showing an example of encryption operation of update differential data in a storage apparatus according to an embodiment of the present invention.

FIG. 3 and FIG. 4 are schematic diagrams showing the operational change of another operational mode of this embodiment.

In FIG. 3 and FIG. 4, the upper diagram shows a plurality of logical volumes before the operational change of the storage apparatus 100, and the lower diagram shows a plurality of logical volumes after the operational change of the storage apparatus 100.

With this storage apparatus 100, a mode is shown where a plain text primary volume 1 and a plain text primary volume 2 storing the plain text data are operated, and plain text secondary volumes 1 to 4 storing the backup data of such plain text data are operated. Further, there is a plain text pool area (indicated as "plain text POOL" in the drawings) for storing differential data (hereinafter referred to as "real differential data") corresponding to the updated portion of actual data (hereinafter referred to as "real data") of the plain text secondary volumes 1 to 4 based on an update command from the host 500. There are volumes (hereinafter referred to as "plain text differential volumes") 1 to 4 for storing the real differential data in the plain text pool area, and the respective differential volumes 1 to 4 correspond to the respective plain text secondary volumes 1 to 4.

Incidentally, in FIG. 3 and FIG. 4, the plain text differential volumes 1 to 4 are indicated as plain text differential VOL 1 to VOL 4.

Under the foregoing status, this kind of operational method is changed to an operational method of encrypting the plain text primary volume 2 during the operation of the storage apparatus 100, and managing it as the encrypted primary volume 2.

Here, as the operational case 1, as shown in FIG. 3, considered may be a case where an encrypted pool area (indicated as "encrypted POOL" in the drawings) for storing only the encrypted data is created separately from the plain text pool area storing the real differential data thus far, and the differential data is encrypted and stored thereby. According to this operational case, realized is discrimination by the storage apparatus 100 restrictively storing the data that it is stored in the plain text pool area and the encrypted pool area as plain text data and encrypted data, respectively.

Incidentally, in FIG. 3 and FIG. 4, the logical volumes (hereinafter referred to as "encrypted differential volumes") 1, 2 to which the differential data is to be encrypted and stored are indicated as encrypted differential VOL 1 and VOL 2.

Meanwhile, as the operational case 2, as shown in FIG. 4, the plain text differential volumes 1, 2 are encrypted within the plain text pool area and stored as the encrypted differential volumes 1, 2. Here, data may be written back to the same area as the plain text differential volumes 1, 2 in the plain text pool area, or a separate area in the plain text pool area may be secured for creating and storing the encrypted differential volumes 1, 2 therein. According to this operational case, the former operational case is shown in FIG. 4. In other words, the encrypted differential volumes 1, 2 and the plain text differential volumes 3, 4 are stored in the same pool area. According to this operational case, it is possible to realize a method of mixing and managing encrypted data and plain text data in a mixed pool area (indicated as "mixed POOL" in the drawings), which is within the same pool area.

Figure 5:
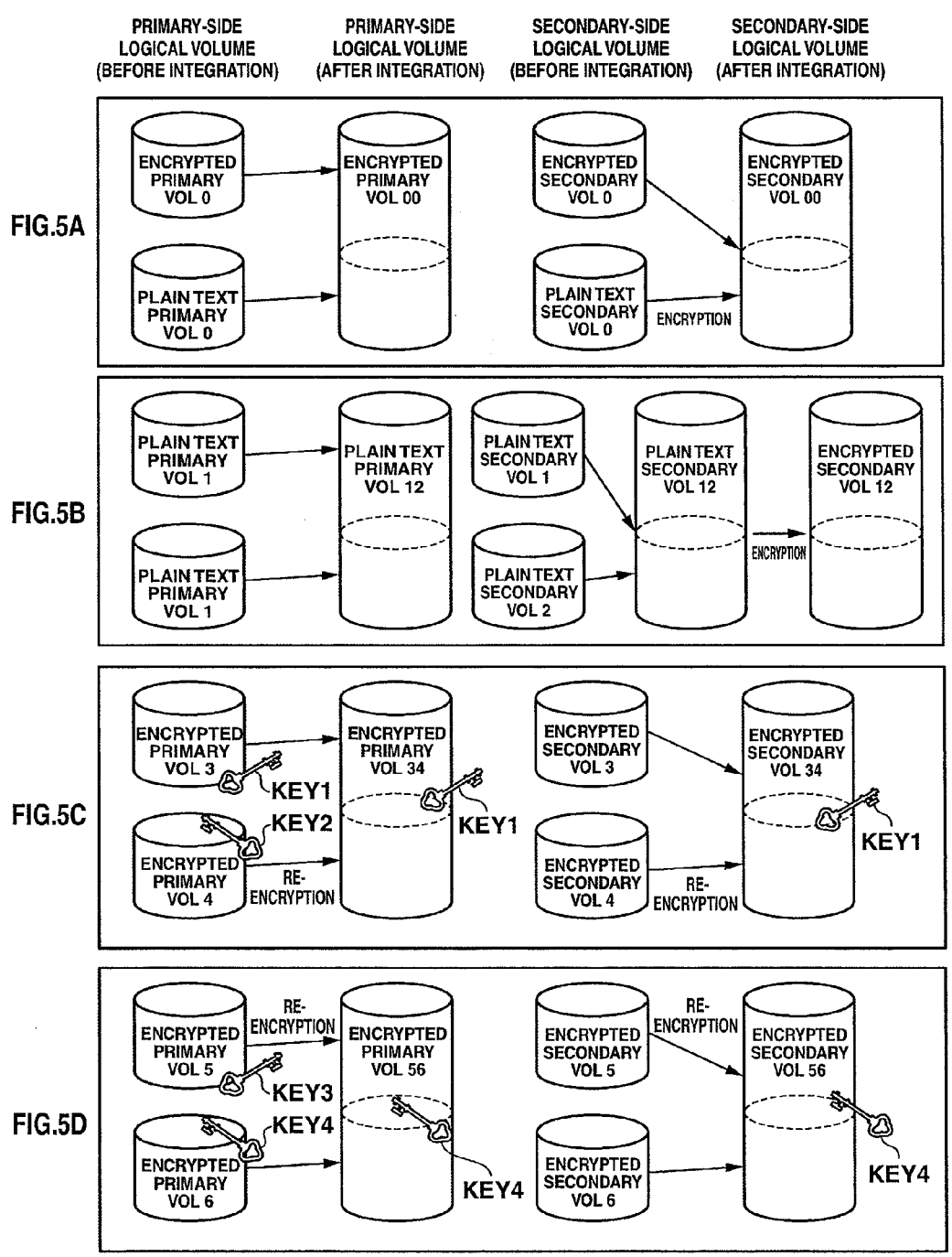
FIG. 5A to FIG. 5D are a schematic diagram showing an example of encryption operation of data when changing the configuration of a storage area in a storage apparatus according to an embodiment of the present invention.

FIG. 5 is a schematic diagram showing the method of operating the encryption function during a configuration change involving the expansion of the logical volume or the like.

FIG. 5A shown in the first row of FIG. 5 is now explained. When expanding the logical volume by integrating a plain text primary volume 0 to a certain encrypted primary volume 0, the encrypted secondary volume 0 and the plain text secondary volume 0 before integration are integrated to create an encrypted secondary volume 00 corresponding to the encrypted primary volume 00 after integration. Data to be stored in the logical volume on the side to be integrated may be erased, or be encrypted so that it can be ongoingly stored in a format that can be continuously used from the host 500 or the like.

FIG. 5B shown in the second row of FIG. 5 is now explained. When expanding the logical volume by integrating a plain text primary volume 2 to a plain text primary volume 1, the plain text secondary volume 1 and the plain text secondary volume 2 before integration are integrated, and expanded as the integrated plain text secondary volume 12.

Here, although the integrated plain text secondary volume 12 may be operated as the plain text secondary volume 12 as is, it is also possible to encrypt the plain text secondary volume 12 after expansion and operate it as the encrypted secondary volume 12 in consideration of the risk of divulging information due to the theft or loss of the portable media such as a tape device storing the backup data.

Although the timing of encryption is based on the setting of the encryption policy, a method where the plain text secondary volumes 1, 2 are encrypted after being integrated and operated as the encrypted secondary volume 12, or a method of subsequently designating the plain text secondary volume 12 and encrypting the backup data stored in the plain text secondary volume 12 and operating this as the encrypted secondary volume 12 may also be used.

FIG. 5C shown in the third row of FIG. 5 is now explained. When integrating an encrypted primary volume 4 encrypted with an encryption KEY 2 to an encrypted primary volume 3 encrypted with an encryption KEY 1, the encrypted secondary volumes 3, 4 before integration are integrated, and expanded as the integrated encrypted secondary volume 34. During the integration as the encrypted primary volume 34, the encrypted primary volume 4 encrypted with the encryption KEY 2 is once decrypted with the encryption KEY 2, and thereafter re-encrypted with the encryption KEY 1.

Here, in accordance with the encrypted secondary volume 3 backed up with the encryption KEY 1, the encrypted secondary volume 34 after integration is operated as an encrypted area to be managed by the encryption KEY 1.

Incidentally, data to be stored in the encrypted secondary volume 34 to be integrated may be erased at the time of integration, or may be subject to re-encryption with the encryption KEY 1 so that it can be ongoingly used.

FIG. 5D shown in the fourth row of FIG. 5 is now explained. When integrating an encrypted primary volume 6 encrypted with an encryption KEY 4 to an encrypted primary volume 5 encrypted with a certain encryption KEY 3, the encrypted secondary volumes 5, 6 before integration are integrated, and expanded to the encrypted secondary volume 56 after integration. Incidentally, during the integration as the encrypted primary volume 56, the encrypted primary volume 5 encrypted with the encryption KEY 3 is decrypted with the encryption KEY 3, and thereafter integrated by being re-encrypted with the encryption KEY 4.

Here, in accordance with the encrypted secondary volume 6 backed up with the encryption KEY 4, the encrypted secondary volume 56 after integration is also operated as an encrypted area to be managed by the encryption KEY 4.

Incidentally, data to be stored after the integration and in the encrypted secondary volume 5 in which the encryption key will change may be erased at the time of integration, or may be subject to re-encryption with the encryption KEY 4 so that it can be ongoingly used. Further, when integrating volumes managed with a plurality of encryption keys as shown in the two operational cases shown in FIG. 5C and FIG. 5D, a means may be provided for the user to select the strength of the encryption key, newness of the created time and other standards.

In the foregoing operational mode, the user will see encrypted volumes and plain text volumes including one or more primary volumes in the first operation. Nevertheless, by using a configuration change function such as a function for expanding the logical volume and integrating one or more other volumes to one primary volume, the user and the OS/application of the host 500 will recognize this as being one logical volume.

Figure 6:
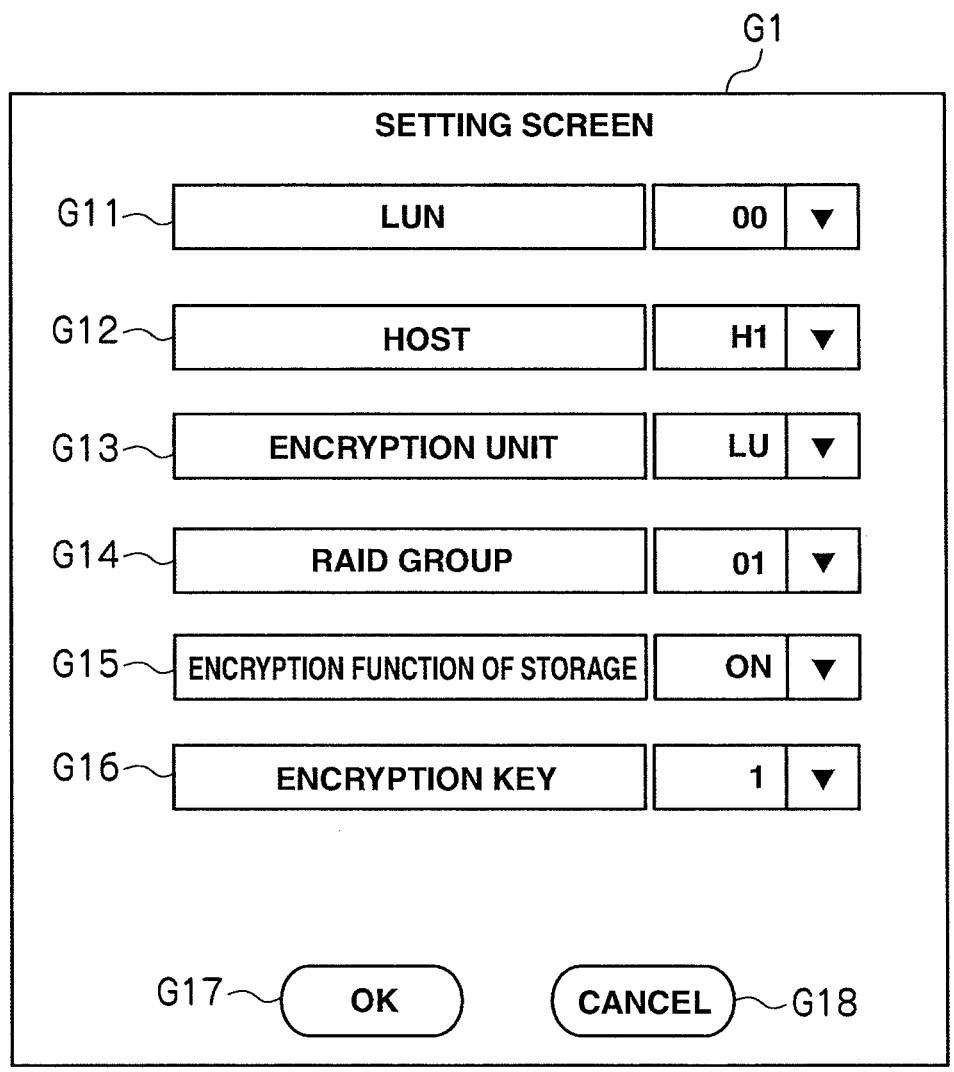
FIG. 6 is an explanatory diagram showing an encryption processing setting screen according to an embodiment of the present invention.

FIG. 6 is an explanatory diagram showing an example of a setting screen G1 to be displayed on the management client 400. The user calls up the setting screen G1 to configure various settings concerning the encryption function. In other words, the encryption setting screen G1 is a user interface for setting the encrypted area management table 253 and the encryption key management table 255, respectively.

The setting screen G1, for example, includes a plurality of setup items G11 to G16, an OK button G17, and a cancel button G18. Each setup item G11 to G16 is given a different name, and the user inputs or selects the value to be set in the respective items.

The LUN setup item G11 is an item for designating the encryption-target LU. The setup item G11 designates the LUN by selecting the identification number given to the logical volume 330.

The host setup item G12 is an item for setting the association of the logical volume 330 designated with the LUN setup item G11 and the host 500, and specifies the host 500.

The encryption unit setup item G13 is an item for designating the unit to realize the encryption unit. Although LU representing a logical volume unit is set in the setting screen G1, a separate setting means may also be provided for selecting the overall storage apparatus 100 or designating a RAID group.

The RAID group setup item G14 is an item for designating the encryption-target RAID group, and can be specified by designating the RAID group number. The RAID group belonging to the LU in the LUN setup item G11 will be set.

The storage encryption function setup item G15 is an item for setting the validation/invalidation of the storage encryption function. Since "ON" is set in the setting screen G1, the encryption function is valid. Nevertheless, when "OFF" is set, the encryption function will not be used. Nevertheless, a value to become the decision criteria other than "ON" and "OFF" may also be set.

The encryption key setup item G16 is an item for setting the status of the encryption key.

After the setting of each setup item G11 to G16 is complete, the user operates the OK button G17. Thereby, the values set in the respective setup items G11 to G16 are reflected in the encrypted area management table 253 and the encryption key management table 255. Meanwhile, when the input setting values are to be cancelled, the user operates the cancel button G18.

Figure 7:
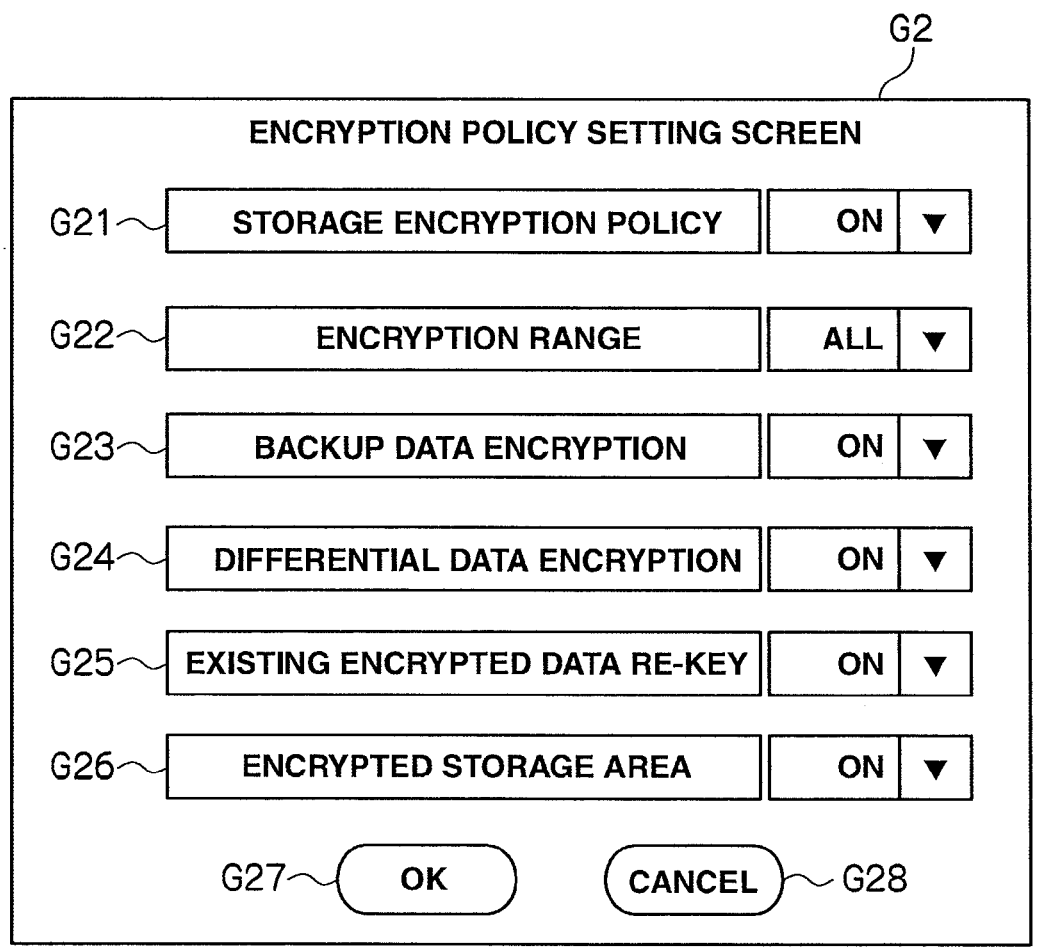
FIG. 7 is an explanatory diagram showing an encryption policy setting screen according to an embodiment of the present invention.

FIG. 7 is an explanatory diagram showing an example of the encryption policy setting screen G2 to be displayed on the management client 400. The encryption policy setting screen G2 is a screen to be displayed subsequent to the setting screen G1 explained with reference to FIG. 6. The user calls up the encryption policy setting screen G2 to configure various settings concerning encryption. In other words, the encryption policy setting screen G2 is a user interface for setting the encrypted area management table 253 and the encryption policy management table 254, respectively.

The setting screen G2, for example, includes a plurality of setup items G21 to G26, an OK button G27, and a cancel button G28. Each setup item G21 to G26 is given a different name, and the user inputs or selects the value to be set in the respective items.

The storage encryption function setup item G21 is an item for determining whether to apply the encryption policy to the setting-target storage apparatus 100 comprising an encryption function.

Here, an encryption policy refers to the configuration information of attributes concerning the encryption function. Configuration information of attributes concerning the encryption function in the present embodiment refers to the setting of validation/invalidation of the encryption function, setting of the encrypted area when the encryption function is valid, setting of the status of the encryption key and other items to be set by the user in the setting screens G1, G2 and the management screen G3 described later.

The encryption range setup item G22 is an item for setting the range of data to be encrypted in the storage apparatus 100. Although ALL showing the overall device is designated in the encryption policy setting screen G2, let it be assumed that values are pre-set for identifying the range of the LUN and the group number of the host 500 and so.

Furthermore, in the setting of the encryption range setup item G22, for instance, a significant character string such as "port 1" may also be used for this setting, or a nickname set in advance for each encryption range may also be used for this setting.

The backup data encryption setup item G23 is an item for determining whether to encrypt the existing backup data associated with the target logical volume in addition to the data input to and output from the host when the user validates the encryption function. Although "ON" for validating the encryption of the backup data is set in the encryption policy setting screen G2, when "OFF" is set, the backup data will not be encrypted. Further, an identification means for configuring the setting based on numerical values may also be provided. The target of encryption will be the backup data including the snapshot data acquired in the storage apparatus 100.

The differential data encryption setup item G24 is an item for configuring the setting concerning the encryption of differential data. Differential data as used herein refers to the differential data of the previous backup portion and the updated portion when taking backup in a times series, and the real data or journal data of the differential of a snapshot.

Further, this is also applicable to other functions for managing differentials required for managing the storage apparatus 100.

The existing encrypted data re-key setup item G25 is an item for setting whether to use an area as the storage area for re-encrypting the data stored as encrypted data in the storage apparatus 100. For example, if the existing encrypted data re-key setup item G25 is set to "ON," the area will be selected as the storage area for re-encrypting the data stored as encrypted data.

The encrypted storage area setup item G26 is an item for setting whether to encrypt and use the storage area of the logical volume 330 set in G11. For example, if the encrypted storage area setup item G26 is set to "ON," the logical volume 330 set in G11 is used as the encrypted storage area. When the encrypted storage area setup item G26 is set to "OFF," the logical volume 330 set in G11 is used as a non-encrypted storage area. The setting value does not necessarily have to be "ON" or "OFF," and may also be a means enabling determination with numerical values.

When the setting of each setup item G21 to G26 is complete, the user operates the OK button G27. Thereby, the values set in each setup item G21 to G26 are reflected in the encrypted area management table 253 and the encryption policy management table 254. Meanwhile, when the input setting value is to be cancelled, the user operates the cancel button G28.

Incidentally, the foregoing setup items may be increased or decreased. In other words, items other than those shown in FIG. 7 may be added according to the conditions to be set in the storage apparatus 100, and certain items may be deleted from the list of items shown in FIG. 7. Further, instead of a graphical user interface, for instance, other user interfaces such as a user interface that inputs a setting value from a command line may also be adopted.

FIG. 8 is an explanatory diagram showing an example of the encryption key management screen 251. The encryption key management screen G3 is a screen to be displayed subsequent to the setting screen G2 explained with reference to FIG. 7. The user calls up the encryption key setting screen G3 to configure various settings concerning the encryption key. In other words, the encryption key setting screen G3 is a user interface for setting the encryption key 251 and the encryption key management table 255, respectively.

The setting screen G3, for example, includes a plurality of setup items G31 to G34, and buttons G35, G36. Each setup item is given a different name, and the user inputs or selects the value to be set in the respective items.

The storage LU area designation item G31 is an item for inputting information in order to specify the LUN of the setting-target storage apparatus 100.

The RAID group designation item G32 is an item for inputting information to specify the RAID group of the setting-target storage apparatus 100.

In the storage LU area designation item G31 and the RAID group designation item G32, generally corresponding numerical values are designated, but the areas can be specified by inputting other values and interpreting such values appropriately.

The key type designation item G33 is an item for designating the type of key to be allocated to each LUN. If the allocation unit is for each LU according to the key allocation policy, a different key may be set for each LUN.

The encryption unit designation item G34 is an item for designating the unit to become the applicable area of the encryption key. With the setting screen G3, although the RAID group is designated, the unit may be the overall storage apparatus 100, LU unit or other units. The encryption unit designation item G34 provides a setting means according to the unit to permit the setting.

FIG. 9 is an explanatory diagram showing an example of the encrypted data address management table 252 to be stored in the cache memory 250.

The encrypted data address management table 252 stores information for managing the destination to save the encrypted data in the storage apparatus 100. The encrypted data address management table 252, for example, is configured from a "LUN" field 2521, a "RAID group" field 2522, a "start LBA" field 2523 and a "LEN" field 2524.

The "LUN" field 2521 stores information for specifying the logical volume 330 of the destination to write the encrypted data. In other words, the "LUN" field 2521 stores the volume number of the encrypted logical volume.

The "RAID group" field 2522 stores information for specifying the group number of the RAID group 320 to which the logical volume 330 as the destination to write the encrypted data belongs.

The "start LBA" field 2523 stores information showing the top address to which the encrypted data is written, and is specifically set as the LBA (Logical Block Address) value.

The "LEN" field 2524 stores information showing the size of the written encrypted data.

FIG. 10 is an explanatory diagram showing an example of the encrypted area management table 253 to be stored in the cache memory 250.

The encrypted area management table 253 is a table for associating and managing the necessity of encryption, designation of key to be used in encryption, and the related areas which may have to undergo encryption processing as a result of encrypting an area represented by the ID in relation to the areas in the storage apparatus 100 given an ID number.

The encrypted area management table 253 is configured from an "ID" field 2531 for uniformly managing the areas in the storage apparatus 100, a "RAID group" field 2532 to which the areas represented with an ID belong, a "LUN" field 2533, an "encryption key" field 2534 to be used for the encryption of the encrypted area, an "encryption attribute" field 2535 for designating whether to encrypt the areas represented with an ID, and a "related area" field 2536 showing the backup destination and restoration destination concerning the encrypted area, and the logical volume associated with the primary data.

Incidentally, "1" in the "encryption attribute" field 2535 of FIG. 10 shows an encrypted area and "0" shows a non-encrypted area.

FIG. 11 is an explanatory diagram showing an example of the encryption policy management table 254 to be stored in the cache memory 250.

The encryption policy management table 254 is a table showing the management status of the encryption policy in the storage apparatus 100.

The encryption policy management table 254 is configured from an "encryption function item" field 2541 for designating various items concerning the encryption function and the function status, a "detailed item" field 2542 for designating further detailed information of the encryption function items, and a "setting value" field 2543 for designating the setting value concerning the encryption to the encryption function item 2541 and the detailed item 2542.

The "encryption function item" field 2541 is used for setting the validation or invalidation of the encryption function and setting items concerning the encryption unit, encryption range, and re-key showing re-encryption.

The "detailed item" field 2542 is a field for setting further details concerning the encryption range in the "encryption function item" field 2541. Specifically, as the detailed items of the encryption range, configuration enables encryption to be set, in addition to the primary data, to the backup data, differential data and remote copy data.

Thereby, when the encryption policy is validated, in addition to the data from the host 500 or the like after encryption is set to the encryption-target area, encryption processing can also be sequentially implemented regarding the existing plain text backup data and differential data related to the encryption-target area in the storage apparatus 100.

It will suffice to provide a means for the user to set a policy concerning encryption upon using the storage apparatus 100, and, although not indicated in the tables of this embodiment, for instance, an encryption function such as the encryption algorithm may be added to the "encryption function item" field 2541, and the present invention is not limited to the format of tables shown in this embodiment.

FIG. 12 is an explanatory diagram showing an example of the encryption key management table 255 to be stored in the cache memory 250.

The encryption key management table 255 is a table for managing whether to provide an encryption key to the logical volume 330 and implement encryption processing.

The encryption key management table 255 is configured from a "key type" field 2551, a "RAID group" field 2552, a "LUN" field 2553 and a "key creation date/time" field 2554.

The "key type" field 2551 stores an encryption key, or information for specifying the encryption key.

The "RAID group" field 2552 stores the group number of the RAID group to become the encryption-target area by using the encryption key designated in the key type 2551.

The "LUN" field 2553 stores a logical volume number for specifying the logical volume in the RAID group designated in the "RAID group" field 2552.

The "key creation date/time" field 2554 stores information on the date and time up to the second in which the encryption key designated in the "key type" field 2551 was created.

For example, in FIG. 12, the "key 1" is applied overall from the LUN "00" to the LUN "02" of the RAID group "01." Further, the key creation data/time of the "key1" stores the information of 2007/01/10/13:58:20, which shows that the encryption key was created on Jan. 10, 2007 at 13:58, 20 seconds. Incidentally, details concerning the format and time may be changed pursuant to the user's operation.

Incidentally, as with all other tables, the configuration of each table is not limited to the illustrated examples so as long as they are able to achieve the present invention.

Figure 13:
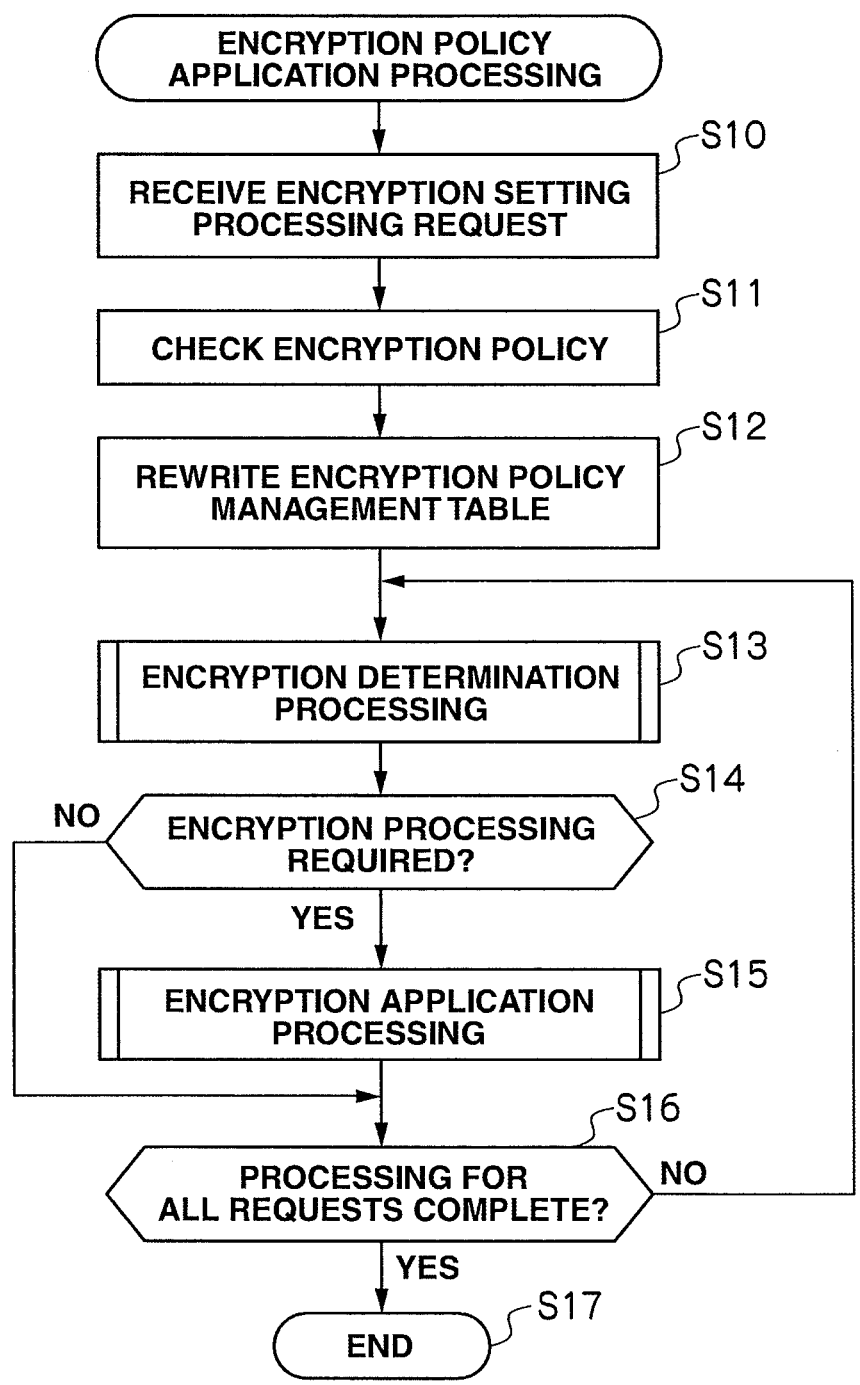
FIG. 13 is a flowchart showing encryption policy application processing according to an embodiment of the present invention.

FIG. 13 is a flowchart showing the processing of the storage apparatus 100 when the application of the encryption policy is instructed from the management client 400, host 500, or the like. The encryption policy application processing is executed by the processor 240 of the storage apparatus 100 based on the encryption policy control unit 266, the encryption/decryption determination unit 261, the encryption processing unit 262, and the decryption processing unit 263.

The respective flowcharts explained below show the outline of the processing, and may differ from the actual computer program. Incidentally, the steps are abbreviated as "S" in the following explanation.

Foremost, when the processor 240 of the storage apparatus 100 receives an encryption setting processing request configured with settings concerning encryption from the management client 400 or the like (S10), it starts the encryption policy application processing.

Subsequently, the processor 240 checks whether the received encryption policy to see whether it can be applied to the storage apparatus 100 (S11). The received encryption policy refers to the encryption policy set the by user in the foregoing setting screens G1, G2 and the management screen G3.

The processor 240 thereafter rewrites the encryption policy management table 253 with the received encryption policy configuration information (S12). For example, if the received encryption policy is applicable to the storage apparatus 100, the processor 240 updates the encryption function of the encryption policy management table 254 from invalid to valid.

The processor 240 reads the encryption policy configuration information with the controller 200 of the storage apparatus 100, and implements the encryption determination processing (S13). The encryption determination processing will be described later.

The processor 240, as a result of the encryption determination processing at step S13, determines whether encryption processing is necessary (S14).

Here, encryption processing refers to the processing of encrypting primary data or data related to the primary data.

When the processor 240 determines that encryption processing is required (S14: YES), it performs encryption application processing (S15). The processor 240 executes encryption processing to the logical volume 330 requiring such encryption processing. A logical volume 330 requiring encryption processing refers to the plain text primary volume requiring encryption processing, or the plain text secondary volume associated with the plain text primary volume.

Meanwhile, when the processor 240 determines that encryption processing is not required (S14: NO), it proceeds to step S16.

Finally, the processor 240 checks whether the request processing is all complete (S16), and, when it consequently determines that the encryption-related processing based on the encryption policy is not complete (S16: NO), the processor returns to step S13, and performs encryption determination processing once again (S13).

For example, when the encryption processing to all logical volumes 330 set with encryption processing is not finished, when the encryption processing of the primary data is not finished, when the encryption processing of data relating to the primary data is not finished, or when the re-setting of the encryption key is not finished, the processor 240 returns to step S13.

Meanwhile, when the processor 240 determines that request processing is all complete (S16: YES), it ends the encryption policy application processing (S17).

Among the foregoing steps, the processor 240 executes step S13 based on the encryption/decryption determination unit 261, and the processor 240 executes step S15 based on the encryption processing unit 262 and the decryption processing unit 263.

Figure 14:
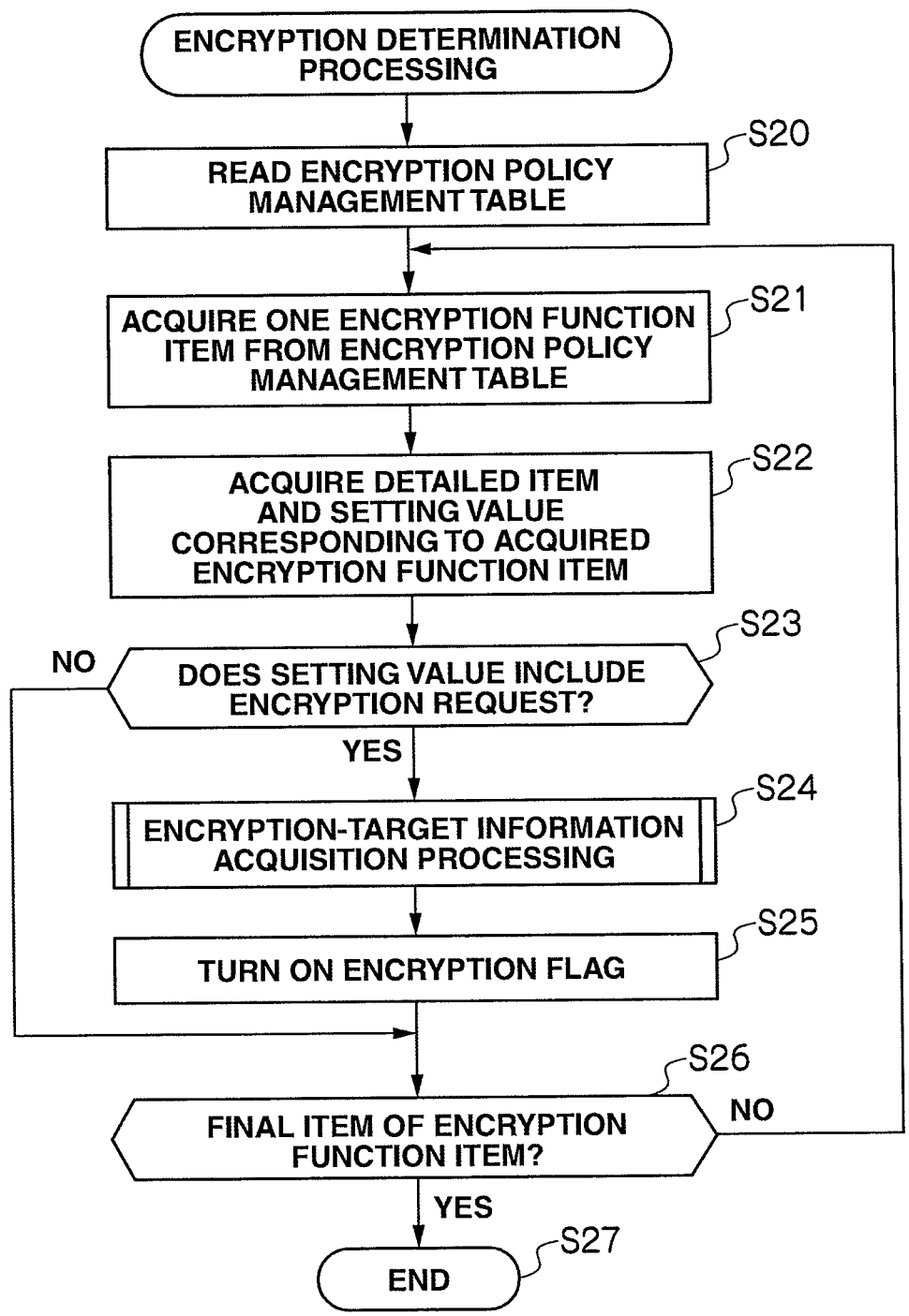
FIG. 14 is a flowchart showing encryption determination processing according to an embodiment of the present invention.

FIG. 14 is a flowchart showing the detailed processing of the encryption determination processing (S13) in FIG. 13. The encryption determination processing is executed by the processor 240 of the storage apparatus 100 based on the encryption/decryption determination unit 261, the encryption policy control unit 266 and the storage area management unit 265.

Foremost, when the processor 240 of the storage apparatus 100 reads the encryption policy management table with the controller 200 (S20), it starts the encryption determination processing.

Subsequently, the processor 240 acquires one encryption function item from the encryption policy management table 254 (S21).

The processor 240 thereafter acquires the detailed item and setting value corresponding to the encryption function item acquired from the encryption policy management table 254 (S22).

Here, the processor 240 determines whether the setting value acquired by referring to the encryption policy management table 254 includes an encryption request (S23).

When the processor 240 determines that there is no encryption request (S23: NO), it proceeds to step S26.

Meanwhile, when the processor 240 determines that there is an encryption request (S23: YES), it performs encryption-target information acquisition processing (S24). The encryption-target information acquisition processing will be described later.

Thereafter, the processor 240 set the encryption flag to ON (S25). In other words, it sets the value of the "encryption attribute" field 2535 of the encrypted area management table 253 to "1."

Subsequently, the processor 240 determines whether the encryption determination processing was executed up to the final item of the encryption function items in the encryption policy management table 254 (S26).

When the processor 240 determines that the encryption determination processing was not executed final item of the encryption function items in the encryption policy management table 254 (S26: NO), it returns to step S21, and continues to perform the encryption determination processing.

Meanwhile, when the processor 240 determines that the encryption determination processing was executed up to the final item of the encryption function items in the encryption policy management table 254 (S26: YES), it ends the encryption determination processing (S27). Then the processor 240 executes step S14 of FIG. 13 based on the result of the encryption determination processing.

Among the foregoing steps, the processor executes steps S20 to S22 based on the encryption policy control unit 266, and the processor 240 executes step S24 based on the storage area management unit 265.

Figure 15:
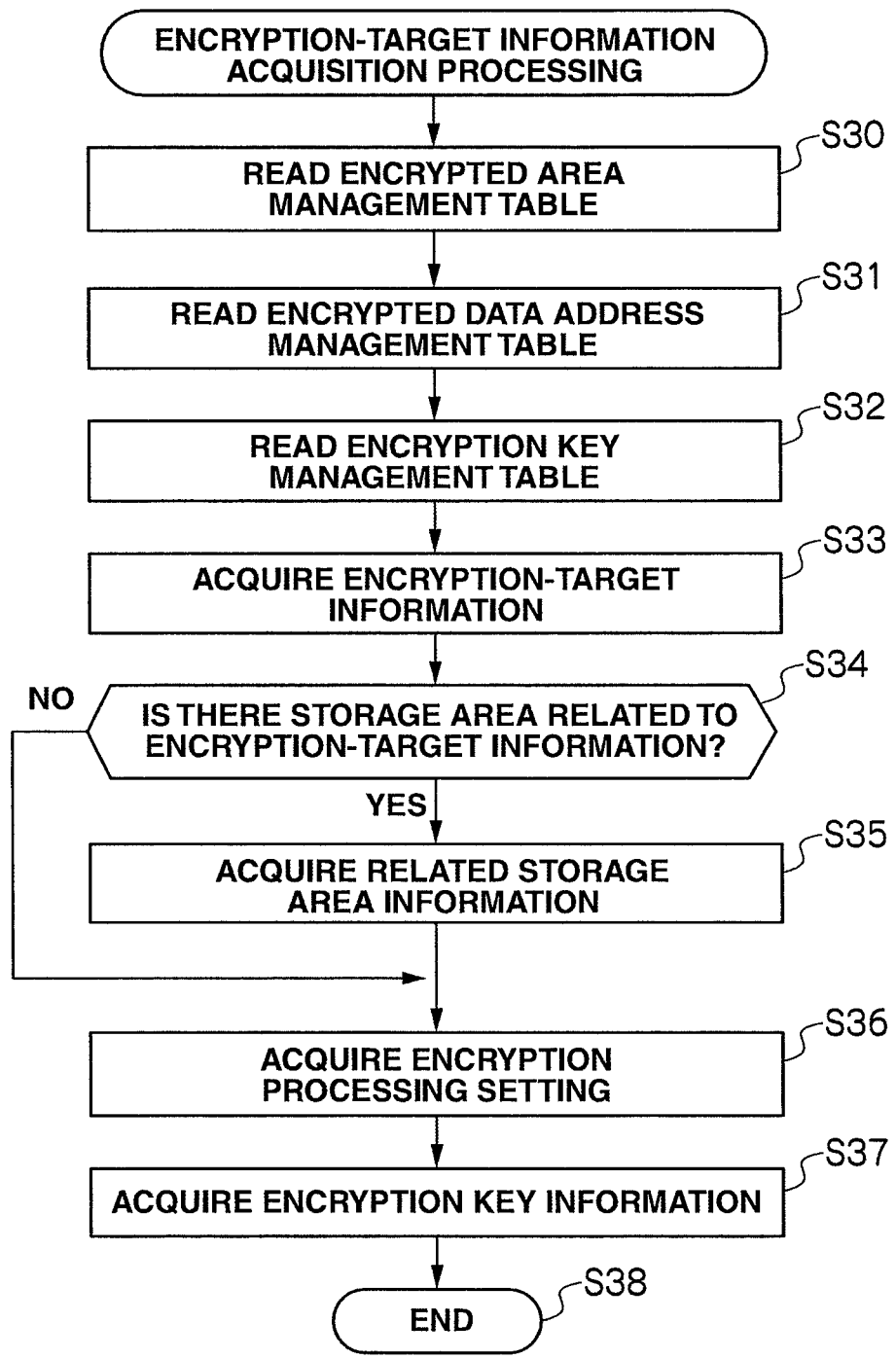
FIG. 15 is a flowchart showing encryption-target information acquisition processing according to an embodiment of the present invention.

FIG. 15 is a flowchart showing the detailed processing of the encryption-target information acquisition processing (S24) of FIG. 14. The encryption-target information acquisition processing is executed by the processor 240 of the storage apparatus 100 based on the storage area management unit 265 and the encryption policy control unit 266.

Foremost, the processor 240 of the storage apparatus 100 reads the encrypted area management table 253 with the controller 200 (S30). Subsequently, the processor 240 reads the encrypted data address management table 252 (S31).

The processor 240 determines the destination to save the encrypted by reading the encrypted area management table 253 and the encrypted data address management table 252.

As the destination to save encrypted data, there are cases of reading the encrypted area management table 253 and storing the encrypted data in a pre-encrypted storage area, and reading the encrypted data address management table 252 and returning the encrypted data to the storage area in which it was stored before being encrypted and storing such encrypted therein. When returning the encrypted data in the same storage area and storing it therein, since the controller 200 will manage the encrypted data and the plain text data in the address of the same storage area, the encrypted data and the plain text data will be mixed and managed in the same storage area.

Subsequently, the processor 240 reads the encryption key management table 255 (S32). Then the processor 240 acquires the encryption-target information based on information from the various types of tables read above (S33).

For example, when the encryption unit of the encryption policy management table 254 shown in FIG. 11 is set to "apparatus," the processor refers to the encrypted area management table 253, and the storage area of RAID groups "01" to "03" will become the encryption-target information.

Then the processor 240 refers to the "related area" field 2536 of the encrypted area management table 253, and determines whether there is a storage area that needs to be encrypted in relation to the storage area that is the encryption-target information; that is, it determines the status of the storage area relating to the encryption-target information (S34).

Consequently, when the processor 240 determines that there is a related storage area (S34: YES), it acquires information on the related storage area (S35). Information concerning the related storage area, as with the case of acquiring the encryption-target information, may be acquired from the information in the various tables 252, 253, 255.

For example, let it be assumed that the processor 240 refers to the storage area in which the value of the "ID" field 2531 of the encrypted area management table 253 of FIG. 10 is "02." Then, it is clear that "ID00-SVOL" is set as the storage area related to the storage area of "02." "ID00-SVOL" shows that the storage area having an "ID" field 2531 value of "00" is a secondary volume. Incidentally, although there is no particular limitation in this setting example, it would suffice so as long as the association between the storage areas is acquired as information.

Meanwhile, when the processor 240 determines at step S34 that there are no related storage areas (S34: NO), it proceeds to step S36.

The processor 240 acquires the detailed setting of the encryption processing from the tables 252, 253, 255 read at step S30 to step S32, and acquires the processing contents for performing encryption processing based on such detailed setting (S36).

Similarly, when the processor 240 acquires the encryption key information from the read tables 252, 253, 255 (S37), it ends the encryption-target information acquisition processing (S38). The processor 240 thereafter executes step S25 shown in FIG. 14 based on the results of the encryption determination processing.

Among the foregoing steps, the processor executes step S32 and step S34 to step S37 based on the encryption policy control unit 266.

Figure 16:
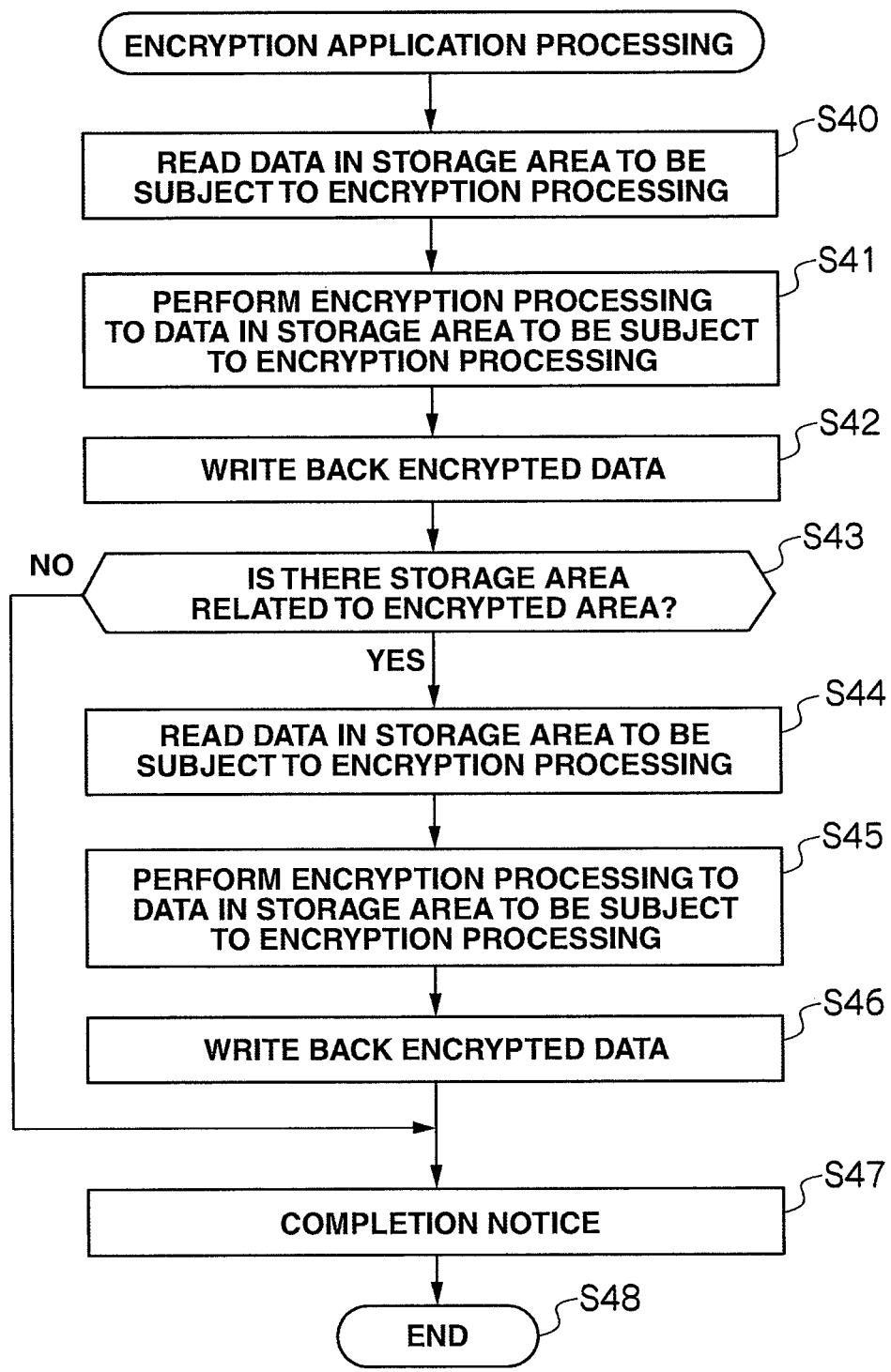
FIG. 16 is a flowchart showing encryption application processing according to an embodiment of the present invention.

FIG. 16 is a flowchart showing the detailed processing of the encryption application processing (S15) of FIG. 13. The encryption determination processing is executed by the processor 240 of the storage apparatus 100 based on the encryption policy control unit 266, the encryption processing unit 262 and the decryption processing unit 263.

Foremost, the processor 240 reads the data stored in the storage area to be subject to encryption processing based on the information acquired from the processing up to the execution of the encryption application processing (S40).

Subsequently, the processor 240 performs encryption processing using the set encryption key for encrypting the encryption-target area data (S41). The processor 240 uses the storage area to be subject to encryption processing as the encrypted area, and encrypts the plain text data stored in the storage area.

The processor 240 thereafter writes back the encrypted data to the encrypted area (S42).

Subsequently, the processor 240 determines whether there is a related area of the encrypted area (S43). When the processor 240 determines that there is a related area (S43: YES), it reads data from the related storage area based on the result of the encryption-target information acquisition processing of FIG. 15 (S44).

The processor 240 thereafter performs encryption processing of data stored in the related storage area using the set encryption key (S45), and writes back the data to the encrypted area (S46).

Finally, the processor 240 sends a completion notice to the management client 400 (S47), and then ends the encryption application processing (S48)

Incidentally, when the processor 240 determines at step S43 that there are no related areas (S43: NO), it sends the completion notice to the management client 400 (S47), and then ends the encryption application processing (S48).

Among the foregoing steps, the processor 240 executes step S41 and step S45 based on the encryption processing unit 262 and the decryption processing unit 263.

The present invention is not limited to the foregoing embodiments. A person skilled in the art may make various additions or modifications within the scope of the present invention.

In this embodiment, although a case was explained where the configuration information management unit for managing the configuration information of attributes concerning the encryption function as information for encrypting data was provided to the cache memory 250, and the encryption execution unit for encrypting data from the host and data stored in the storage apparatus based on the configuration information of attributes concerning the encryption function was provided to the memory 260, the configuration information management unit and the encryption execution unit may also be provided as independent hardware configurations.

Further, although the encryption determination unit for determining whether to encrypt the data from the host or the data stored in the storage apparatus based on the configuration information of attributes concerning the encryption function was provided to the memory 260, similar to the above, the encryption determination unit may be provided as an independent hardware configuration.

The present invention can be broadly applied to a storage system having one or more storage controllers, and to storage systems of various other configurations.

What is claimed is:

1. A storage controller comprising a storage apparatus for storing data from a host computer in a primary volume and storing backup data of the data from the host computer in a secondary volume, and a controller for controlling the input and output of data stored in said storage apparatus, wherein said storage controller comprises:

a configuration information management device constructed at least in part of one of a hardware processor and circuitry, and configured to manage configuration information of attributes concerning an encryption function as information for encrypting data, and manage setting information to manage a corresponding relationship between the primary and secondary volumes;

an encryption determination device constructed at least in part of one of a hardware processor and circuitry, and configured to determine to perform encryption to data stored in said storage apparatus based on said configuration information of attributes concerning the encryption function, said encryption determination device searches and determines information of said storage apparatus for performing encryption, and searches and determines information of a storage area related to said storage apparatus for performing encryption;

an encryption execution device constructed at least in part of one of a hardware processor and circuitry, and configured to perform encryption of the data from said host computer in the primary volume, determine the secondary volume corresponding to the primary volume based on the setting information, and perform encryption of the data previously stored in the secondary volume in said storage apparatus based on said configuration information of attributes concerning the encryption function;

wherein said encryption execution device performs encryption to data related to data stored in said storage apparatus, upon performing encryption to said data stored in said storage apparatus; and wherein the encryption execution device, responsive to a request to change non-encrypted data previously stored in the primary volume to encrypted data, encrypting the non-encrypted data to the encrypted data, determining the secondary volume corresponding to the primary volume based on the setting information, and performing encryption of corresponding non-encrypted backup data previously stored in the secondary volume to encrypted backup data, based on said configuration information of attributes concerning the encryption function.

2. The storage controller according to claim 1, wherein a plurality of storage apparatuses are provided; and wherein said data is stored in a plurality of storage areas provided by said plurality of storage apparatuses or in a plurality of storage areas dynamically provided by said plurality of storage apparatuses.

3. The storage controller according to claim 2, wherein said configuration information management device includes an area management table for managing said storage apparatus for performing encryption and a storage area related to said storage apparatus or an address management table for managing an address of data stored in said storage apparatus and an address of data stored in a storage area related to said storage apparatus.

4. The storage controller according to claim 2, wherein said configuration information management device includes an encryption key management table for managing an encryption key provided to encrypt or decrypt said storage apparatus for performing encryption and a storage area related to said storage apparatus.

5. A data encryption method of a storage controller comprising a storage apparatus for storing data from a host computer in a primary volume and storing backup data of the data from the host computer in a secondary volume, and a controller for controlling the input and output of data stored in said storage apparatus, wherein said storage controller implemented at least in part by a processor, performs:

a configuration information management operation managing configuration information of attributes concerning an encryption function as information for encrypting data, and managing setting information to manage a corresponding relationship between the primary and secondary volumes;

an encryption determination operation determining to perform encryption to data stored in said storage apparatus based on said configuration information of attributes concerning the encryption function, said encryption determination operation searching and determining information of said storage apparatus for performing encryption, and searching and determining information of a storage area related to said storage apparatus for performing encryption;

an encryption execution operation performing encryption of the data from said host computer in the primary volume, determining the secondary volume corresponding to the primary volume based on the setting information, and performing encryption of the data previously stored in the secondary volume in said storage apparatus based on said configuration information of attributes concerning the encryption function;

wherein said encryption execution operation performing encryption to data related to data stored in said storage apparatus, upon performing encryption to said data stored in said storage apparatus; and wherein the encryption execution operation, responsive to a request to change non-encrypted data previously stored in the primary volume to encrypted data, encrypting the non-encrypted data to the encrypted data, determining the secondary volume corresponding to the primary volume based on the setting information, and performing encryption of corresponding non-encrypted backup data previously stored in the secondary volume to encrypted backup data, based on said configuration information of attributes concerning the encryption function.

6. The data encryption method according to claim 5, wherein a plurality of storage apparatuses are provided; and wherein said data is stored in a plurality of storage areas provided by said plurality of storage apparatuses or in a plurality of storage areas dynamically provided by said plurality of storage apparatuses.

7. The data encryption method according to claim 6,
wherein at said configuration information management operation, including an area management table for managing said storage apparatus for performing encryption and a storage area related to said storage apparatus or an address management table for managing an address of data stored in said storage apparatus and an address of data stored in a storage area related to said storage apparatus, and managing said configuration information of attributes concerning the encryption function based on said area management table or said address management table.

8. The data encryption method according to claim 6,
wherein at said configuration information management operation, including an encryption key management table for managing an encryption key provided for encryption or decryption to said storage apparatus for performing encryption and a storage area related to said storage apparatus, and managing said configuration information of attributes concerning the encryption function based on said encryption key management table.

9. A storage system comprising a storage controller for controlling the input and output of data to be stored in a storage apparatus for storing data from a host computer in a primary volume and storing backup data of the data from the host computer in a secondary volume,
wherein said storage controller comprises:
a configuration information management device constructed at least in part of one of a hardware processor and circuitry, and configured to manage configuration information of attributes concerning an encryption function as information for encrypting data, and manage setting information to manage a corresponding relationship between the primary and secondary volumes;
an encryption determination device constructed at least in part of one of a hardware processor and circuitry, and configured to determine to perform encryption to data stored in said storage apparatus based on said configuration information of attributes concerning the encryption function, said encryption determination device searches and determines information of said storage apparatus for performing encryption, and searches and determines information of a storage area related to said storage apparatus for performing encryption;
an encryption execution device constructed at least in part of one of a hardware processor and circuitry, and configured to perform encryption of the data from said host computer in the primary volume, determine the secondary volume corresponding to the primary volume based on the setting information, and perform encryption of the data previously stored in the secondary volume in said storage apparatus, based on said configuration information of attributes concerning the encryption function;
wherein said encryption execution device performs encryption to data related to data stored in said storage apparatus, upon performing encryption to data stored in said storage apparatus; and
wherein the encryption execution device, responsive to a request to change non-encrypted data previously stored in the primary volume to encrypted data, encrypting the non-encrypted data to the encrypted data, determining the secondary volume corresponding to the primary volume based on the setting information, and performing encryption of corresponding non-encrypted backup data previously stored in the secondary volume to encrypted backup data, based on said configuration information of attributes concerning the encryption function.

10. The storage system according to claim 9,
wherein a plurality of storage apparatuses are provided; and
wherein said data is stored in a plurality of storage areas provided by said plurality of storage apparatuses or in a plurality of storage areas dynamically provided by said plurality of storage apparatuses.

11. The storage system according to claim 10,
wherein said configuration information management device includes an area management table for managing said storage apparatus for performing encryption and a storage area related to said storage apparatus or an address management table for managing an address of data stored in said storage apparatus and an address of data stored in a storage area related to said storage apparatus.

12. The storage system according to claim 10, wherein said configuration information management device includes an encryption key management table for managing an encryption key provided for encryption or decryption to said storage apparatus for performing encryption and a storage area related to said storage apparatus.

* * * * *